United States Patent Office 3,461,041
Patented Aug. 12, 1969

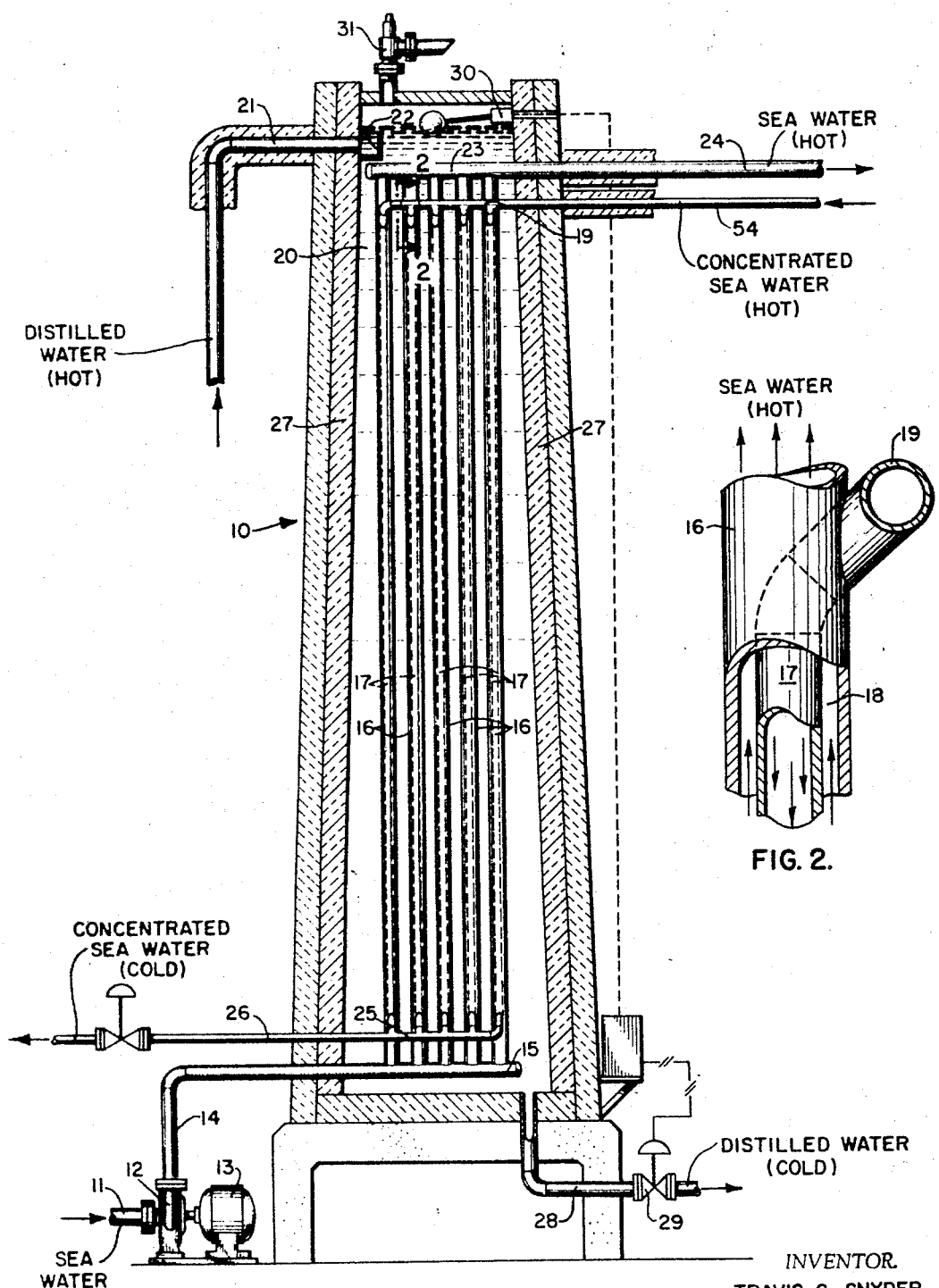

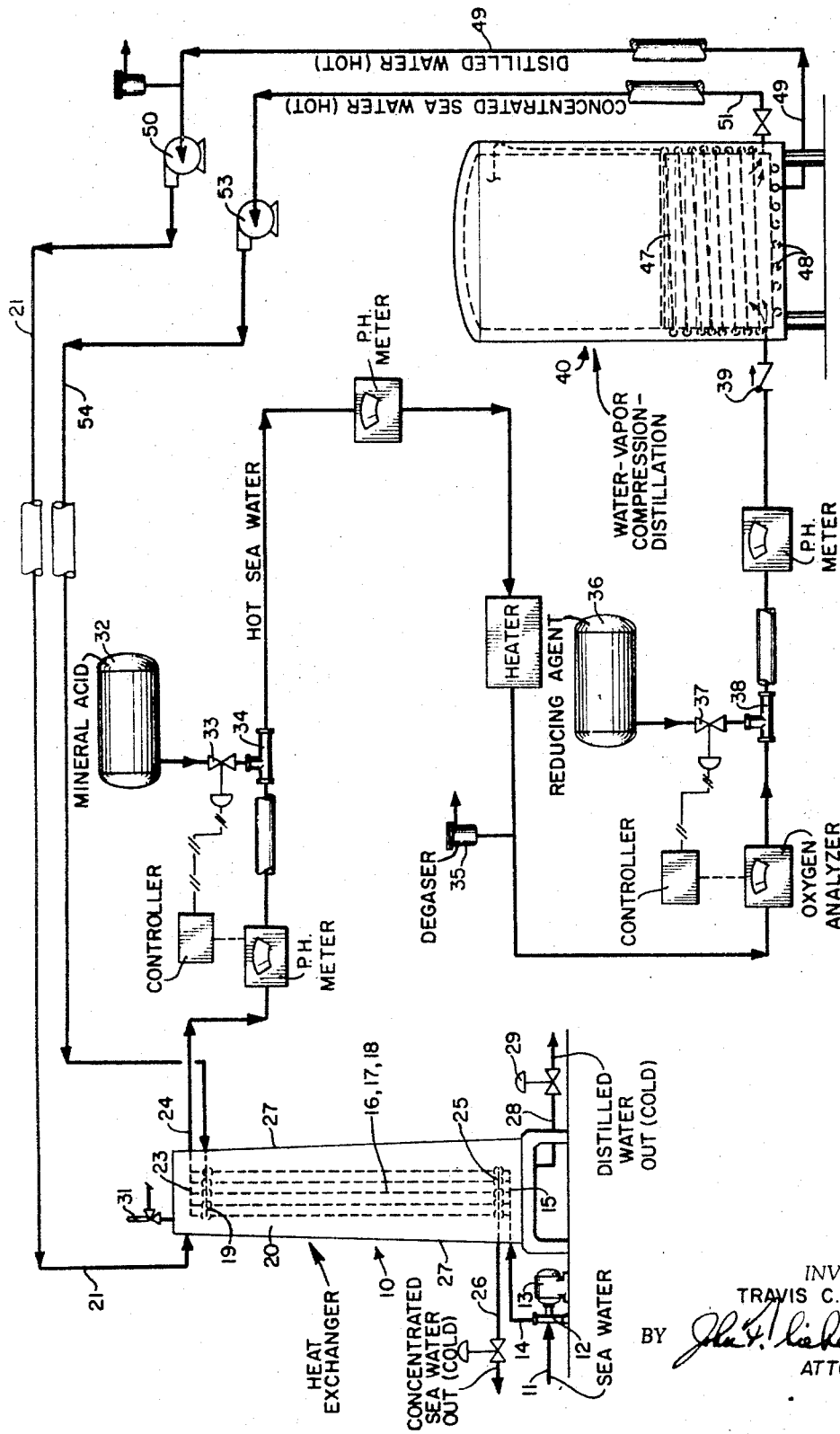

3,461,041
**VAPOR COMPRESSION DISTILLATION OF CHEM-
ICALLY TREATED DEGASSED SALINE WATER**
Travis C. Snyder, 1150 Aster St., Apt. 113,
Baton Rouge, La. 70802
Filed May 29, 1967, Ser. No. 642,026
Int. Cl. C02b *1/06;* B01d *3/34, 3/14*
U.S. Cl. 203—7                                6 Claims

ABSTRACT OF THE DISCLOSURE

A distillation method and apparatus for recovering fresh water from saline water wherein saline water is passed upwardly through a tower-like reservoir in indirect heat exchange with hot distillate. The hot saline water is treated with mineral acid, and the gases formed released. The resultant saline water is treated to remove dissolved oxygen, after which the hot degassed water is subjected to vapor compression distillation with isolation of distillate water and concentrated saline water.

---

The technology is particularly suitable for recovering pure water from sea water but has other applications.

Advantages include high thermodynamic efficiency; economical, practical, safe, trouble-free, continuous, automated operation; and in the case of sea water purification, reduction in scale formation and in metallic corrosion within the still.

This invention relates to methods and apparatus for distilling liquids in a highly efficient manner. More particularly, this invention relates to high efficiency recovery of fresh water from sea water and other impure aqueous systems (such as are available from brine wells, paper manufacture, chemical process industries and other sources).

The art of distilling, concentrating, and evaporating liquids has been successfully utilized for effecting numerous and sundry separations and purifications. Nevertheless, the art continues to search for ways of improving the thermodynamic efficiency of the process. Contributing to the difficulties in achieving these goals are practical and economic considerations—a distillation process of higher thermodynamic efficiency will find only limited application if it involves unduly complicated or excessively expensive apparatus. A case in point is the need for a highly efficient, economical, practical, safe and trouble-free process and apparatus for distilling sea water and similar aqueous saline solutions. Fulfillment of this need would be a welcome contribution to the art.

Accordingly an object of this invention is to fulfill, or at least contribute to the fulfillment of, this need. Another object is to provide a new, thermodynamically efficient method for distilling, concentrating, and evaporating liquids. A particular object is to provide a new and useful process and apparatus for purifying sea water.

Referring to the drawings:

FIGURE 1 represents a sectional view of a heat transfer column or tower and illustrates a practical way by which various heat transfer principles of this invention may be utilized advantageously and simultaneously;

FIGURE 2 is an enlarged fragmentary section of an elongated heat exchanger conduit taken along lines 2, 2 of FIGURE 1 and illustrates a convenient way by which countercurrent flow and concentric, out-of-contact heat exchange may be effected in utilizing some of the particular heat transfer principles of this invention;

FIGURE 4 is a schematic flow sheet partly in cross section depicting a typical installation for recovering fresh water from sea water and the like in accordance with a preferred embodiment of this invention.

Figure 3:
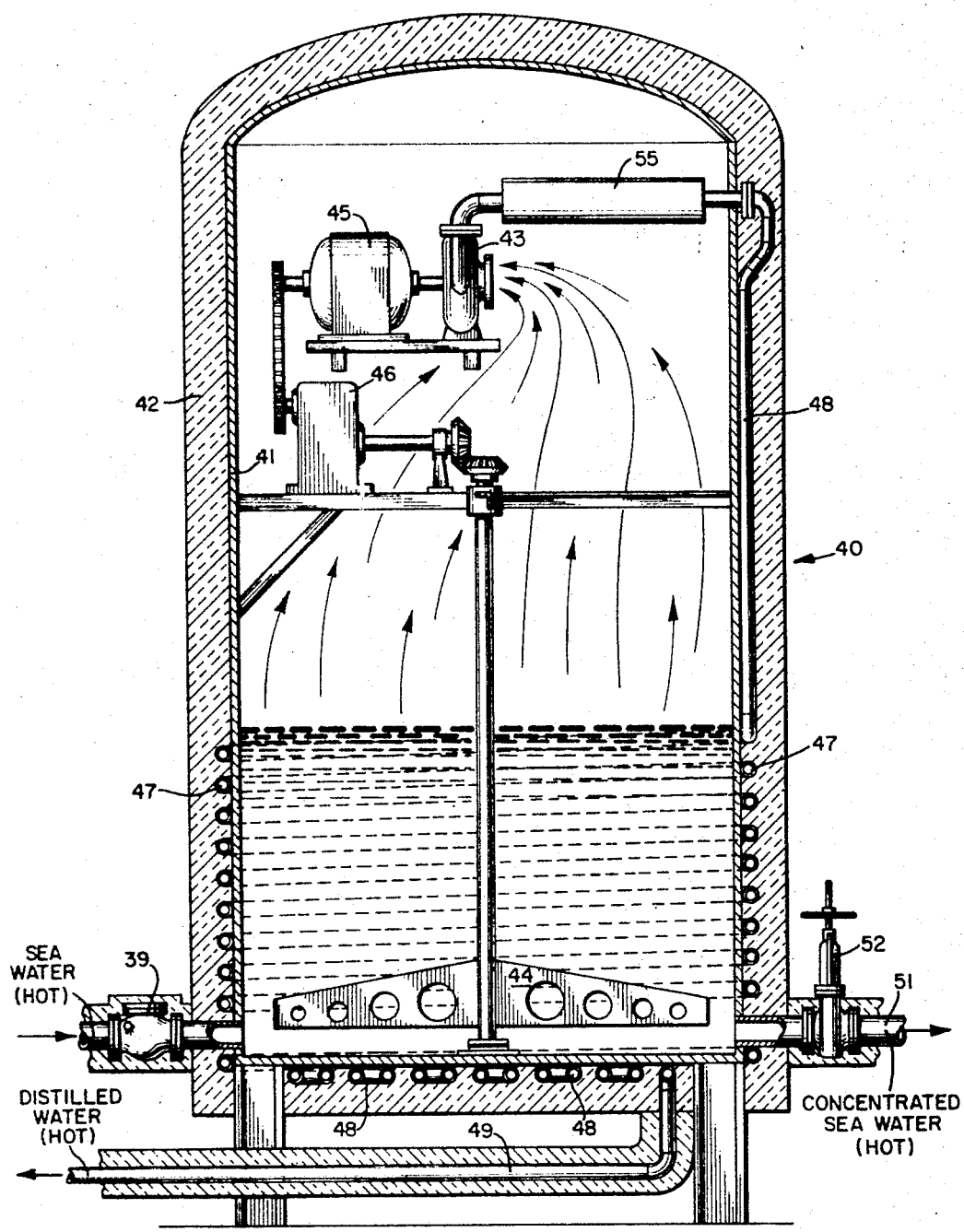
FIGURE 3 represents a sectional view of vapor compression distillation apparatus typical of that utilized in the practice of this invention.

As will be seen from even a casual inspection of the above figures, this invention involves, inter alia, the combination of a highly efficient heat transfer column and a vapor compression distillation system. The vapor compression distillation step is conducted in such a way that distillate and distilland (i.e., pot residue) are isolated while their temperatures are not far below the boiling temperature of the distillate. The isolated distillate and distilland and the heat energy possessed thereby are utilized in the heat transfer column in such a way that a temperature gradient is established and maintained therein. Incoming distillable liquid is placed in out-of-contact heat exchange relation to the heat transfer column so that the temperature of the incoming liquid is progressively and efficiently elevated. When the incoming liquid leaves the heat transfer column it is almost at its boiling point and constitutes the feed to the vapor compression distillation system. Hence a feature of this invention is the establishment and maintenance of a significant temperature gradient within the heat transfer column whereby, concurrently, (a) the temperature of the incoming distillable liquid is progressively and efficiently raised from input temperature (normally close to ambient temperature) up to almost the normal boiling point of the distillable liquid, and (b) the temperature of the isolated vapor compression distillate and distilland is progressively and efficiently lowered from input temperature (almost the normal boiling point of the distillable liquid) down to output temperature (normally close to ambient temperature).

By proper construction and operation of the heat exchange column almost total transfer of heat from the hot distillate and hot distilland to the incoming feed of the distillable liquid is possible in accordance with this invention. To accomplish this advantageous feature, the invention, in its preferred embodiments, utilizes in the heat exchange column the combination of (1) a density gradient and (2) countercurrent flow of initially hot and initially cool (ambient temperature) liquids. More particularly, a preferred aspect of the invention involves providing a relatively large, generally vertical tower to contain a reservoir of liquid corresponding to the desired distillate. During operation, the hot distillate is introduced into the upper region of a relatively quiescent body of distillate contained in the tower. This in turn helps to establish and maintain a temperature gradient within the reservoir by virtue of the fact that the density of most liquids increases with decreasing temperature. Hence as it gives up its heat energy the distillate will progressively but slowly gravitate to the bottom of the reservoir where it may be withdrawn at essentially ambient temperature.

In short, the temperature gradient within this reservoir is partially maintained by the progressively decreasing density (and progressively increasing temperature) of the liquid from bottom to top.

Passing upwardly through this reservoir is a flow of the incoming liquid to be distilled (input feed), this flow being through suitable heat exchanger means (e.g., conduits having high lateral heat transfer properties). By suitably insulating the reservoir against undesired heat loss to the outside surroundings, the heat energy of the body of distillate contained in the tower is transferred to the upwardly flowing input feed. Inasmuch as the input feed is cool at the outset (e.g., at about ambient temperature) it continuously absorbs heat energy from the distilled liquid in the reservoir at an essentially constant rate as the input feed flows upwardly through the heat exchanger means. This essentially constant rate of heat exchange in turn further contributes to the maintenance of the inverse density-temperature gradient within the body of the distillate in the reservoir. At the same time, the upwardly flowing input feed is progressively heated until it reaches a temperature in close proximity to that of the hot distillate which is introduced into the upper region of the relatively quiescent body of distillate within the tower. Consequently the thermal equilibria as between the large, relatively quiescent body of distillate and the upward flow of the input feed tend to reinforce the tendency of the body of distillate to maintain (via the inverse relationship between temperature and density) an upwardly increasing temperature gradient. In short, the density gradient of the reservoir and the heat transfer from the reservoir to the feed of the liquid to be distilled work in concert not only to progressively elevate the temperature of such feed to almost its boiling point, but to maintain the upwardly increasing temperature gradient within the heat exchange tower so that a steady-state, continuous and highly efficient heat exchange operation may be accomplished.

As noted above, another principle is utilized pursuant to this invention in achieving almost total transfer of heat within the heat exchange tower. Thus in the preferred embodiments, this invention not only utilizes the density gradient and heat exchange aspects just discussed, but also makes effective, efficient use of countercurrent flow as between initially hot and initially cool (ambient temperature) liquids in achieving thermodynamically efficient operation. More particularly, passing downwardly through the tower reservoir is a flow of the initially hot distilland, this flow being through suitable heat exchanger means. In most preferred form, the initially hot distilland is caused to flow in concentric, out-of-contact heat exchange relation to the upwardly flowing input feed (distillable liquid). This is best accomplished by positioning within the tower a plurality of elongated heat exchanger conduits, each of which has an innermost passage and a coaxial annular passage. The initially hot distilland is passed downwardly through the innermost passage; the initially cool input feed is propelled upwardly through the annular passage. In this way a number of advantageous events occur at the same time:

(1) Heat energy is transferred outwardly from the distilland to the input feed;

(2) Heat energy is transferred inwardly from the distillate to the input feed;

(3) As the input feed rises it receives heat at an essentially constant rate;

(4) As the distillate loses heat it becomes more dense and gradually gravitates toward the bottom of the tower; and (5) As the distilland flows downwardly it loses almost all of its excess heat energy at an essentially constant rate.

The net effects are that an over-all upwardly increasing temperature gradient is maintained within the system, the system achieves a steady state condition, and virtually all excess thermal energy brought into the system via the hot distillate and hot distilland is returned to the vapor compression distillation system via the heated input feed.

Also contributing to the excellent thermodynamic efficiency of the various embodiments of this invention is the use of vapor compression distillation, an operation of well-recognized thermal efficiency (see, for example, U.S. 849,579 to Siebel, U.S. 2,469,122 to Latham, Jr., and U.S. 3,109,782 to Nathan). In accordance with this invention, the energy requirements for the vapor compressor means are kept relatively small by providing the input feed to the still at a temperature below, but in proximity to, its normal boiling point and by maintaining a relatively small pressure differential as between the vaporization zone within the still and the compression zone directing compressed vapor into out-of-contact heat exchange relation with the boiling liquid within the still. Further, when recovering certain distillable liquids from solutions comprising the same (e.g., when recovering fresh water from sea water) the vapor compressor energy requirements are still further reduced by removing dissolved gases prior to introducing the solution into the still.

Although this invention is applicable to the purification of distillable liquids in general, it is particularly well suited for the desalinization of sea water and the like. When applied to this use, it is particularly desirable to degasify the incoming sea water before it is introduced into the still. Not only does this lessen the work which would otherwise be done by the compressor means associated with the vapor compression system, but even more importantly, degasification markedly reduces the extent to which scale formation occurs on heat exchanger surfaces within the still. Furthermore, degasification minimizes the corrosiveness of the hot sea water and makes it possible to use cheaper metals and alloys in fabricating the vapor compression apparatus—metals and alloys which would otherwise be severely corroded by hot sea water.

In order to still further appreciate the nature of this invention and the advantageous features associated therewith particular reference shall now be made to the figures of the drawings. To facilitate matters, the preferred embodiments of this invention as applied to the recovery of fresh water from sea water shall be considered in detail. It will be understood and appreciated however that most, if not all, of the features of this invention may be applied to the purification, concentration, evaporation and/or distillation of any distillable liquid typically those which boil under normal conditions at a temperature within the range of about 60 to about 300° C., and especially those which (a) boil at a temperature significantly higher (e.g., in the order of at least about 40 to 50° C. higher) than their input temperature and (b) are susceptible to vapor compression distillation. In the respective figures the same numerical designations have been applied whenever applicable.

Input sea water, which preferably has been passed through at least a coarse filter system (not shown) so as to remove any sea weed or other debris, is drawn into the base of the heat exchange tower indicated generally by the numeral 10 by means of line 11, pump 12 driven by motor 13, and line 14 terminating in manifold 15. Before entering this manifold the sea water is normally at ambient temperature. Manifold 15 distributes the feed among a plurality of vertical, elongate heat exchange conduits 16 which, along a substantial portion of their length, concentrically enclose smaller diameter conduits 17. The input feed is thus pumped upwardly through the annular passages 18 existing between the inner walls and outer walls of conduits 16 and 17 respectively. Concentrated sea water—i.e., distilland from the vapor compression distillation apparatus indicated generally by the numeral 40—is fed into the upper ends of conduits 17 by manifold 19. This distilland as fed into manifold 19 is at a temperature below, but in proximity to, the boiling point at the prevailing pressure. Thus in this case, where sea water is involved, the input temperature of the concentrated sea water is at least about 85° C. and preferably from at least about 95° C. to about 100° C. As this initially hot concentrated sea water flows downwardly through conduits 17 it gives up heat energy to the input sea water passing upwardly in the annular passages 18 within conduits 16. This heat transfer cools the concentrated sea water and heats the input sea water. The hot input sea water leaves tower 10 via manifold 23 and thermally insulated line 24. The cooled concentrated sea water leaves the tower via manifold 25 and line 26.

Tower 10 contains a reservoir or body of distilled water 20, which is maintained by introducing fresh distilled water—i.e., distillate from the vapor compression distillation apparatus 40—into the upper region of the tower via thermally insulated line 21. This incoming distilled water is at a temperature below, but in proximity to, its boiling point at the prevailing pressure. Hence its temperature when introduced into the tower is at least about 85° C. and preferably from at least about 95° to about 98° C. The reservoir of distilled water 20 is maintained in a relatively quiescent state and to this end a baffle plate or similar shielding 22 is provided to decrease turbulence within the reservoir.

As noted above, the distilled water as it is introduced into the upper region of the reservoir 20 is at a high temperature and the walls 27 of tower 10 are thermally insulated (e.g., by means of firebrick, asbestos, or other suitable insulating material) so as to reduce to the extent practicable heat loss to the outside surroundings. Thus in the upper region of reservoir 20 the hot distilled water gives up some of its heat energy to the input sea water leaving toward 10 via manifold 23 and, somewhat below this region, to the input sea water passing upwardly in the annular passages 18 within conduits 16. This heat transfer causes the distilled water to become somewhat more dense so that it gradually gravitates downwardly whereby it continuously or progressively gives up still additional heat energy to the input sea water passing upwardly in the annular passages 18 within conduits 16. When the downwardly gravitating distilled water reaches the lower region of tower 10 it is cool inasmuch as it has given up virtually all of its excess heat energy to assist in heating the input sea water via this heat exchange. The cool distilled water is drawn off from tower 10 via line 28. Automatic valve 29 permits or stops the flow of distilled water from the tower in response to a signal initiated by sensing mechanism 30. Pressure relief valve 31 keeps the pressure in the space above the reservoir from significantly exceeding atmospheric pressure.

Consequently the concurrent heat exchanges, countercurrent flows and gravitational effects occurring within tower 10 give rise to the establishment and maintenance of an upwardly increasing temperature gradient therein. Further, almost total transfer of heat from the concentrated sea water and the hot distilled water to the input sea water may be accomplished therein. Hence the input sea water as it leaves the tower via thermally insulated line 24 will have had its temperature raised from input ambient temperature (e.g., 20–30° C.) to at least 85° C. and preferably up to almost its boiling point at the prevailing pressure. Although not shown in the figures, heating means may be positioned within tower 10 to assist in start up of the system. In this way the tower may be filled with pure water and after it becomes quiescent the heaters turned on so as to heat the uppermost volume to almost the boiling point, the remainder of the heating being regulated so as to initially establish the desired upwardly increasing temperature gradient. Thereupon the over-all system is put into operation and the heaters turned off—the system itself thereafter maintaining the temperature gradient.

Continuing with reference to the figures, the hot input sea water flowing in thermally insulated line 24 is subjected to degasification prior to being fed into vapor compression distillation apparatus 40. In the depicted preferred degasification section of the system (note FIGURE 4) the pH of this hot sea water is automatically adjusted so as to be on the slightly acid side (e.g., pH of 6–7) by the introduction of a suitable quantity of mineral acid from vessel 32 through automatic valve 33 and into mixing nozzle 34. Valve 33 is actuated in response to a signal initiated by a pH meter associated with a conventional controller so that the pH of the hot sea water in thermally insulated line 24 is uniformly changed from the usual pH of 8 or 9 to from 6 to 7. Mixing nozzle 34 insures thorough blending of the acid into the sea water. Suitable acids for this use include sulfuric, hydrochloric and nitric acids. After the hot sea water has been acidified in this manner it is heated to the extent necessary to be almost at its boiling point at the prevailing pressure (on the average, sea water generally has a boiling point in the vicinity of about 101° C.) and then is caused to pass by a conventional vapor or gas eliminator 35. Carbon dioxide and other dissolved gases are released from the hot sea water through gas eliminator 35 without at the same time permitting any appreciable intake of air. The elimination of carbon dioxide from the sea water at this point of the operation sharply decreases the amount of "boiler scale" which would otherwise form within and foul the heat exchanger surfaces of the vapor compression distillation apparatus 40. More particularly, if the carbon dioxide were allowed to remain in the sea water it would, under the conditions existing within the vapor compression distillation apparatus 40, combine with metallic ions, such as $Mg^{++}$, to form insoluble salts such as $MgCO_3$. However by acidifying the system and bringing it to practically its boiling point, the carbon dioxide is essentially eliminated while at the same time eliminating most of the other gases previously dissolved in the sea water. Therefore this portion of the degasification procedure provides for elimination of fouling and attendant interference with heat exchange in the ensuing vapor compression distillation. Moreover elimination of these dissolved gases lessens the work which the compressor must do in connection with that distillation.

Next the hot sea water is treated in such a way as to remove any small quantity of dissolved oxygen which may remain therein. This further degasification is preferably accomplished by introducing a suitable quantity of an appropriate reducing agent from vessel 36 through automatic valve 37 and into mixing nozzle 38. Valve 37 is actuated in response to a signal initiated by an oxygen analyzer associated with a conventional controller so that sufficient reducing agent is thoroughly and uniformly blended into the hot, slightly acid sea water to cause the oxygen to be reduced to water. The reducing agent is preferably introduced in the form of an aqueous solution and a variety of materials may be used for this purpose. For example use may be made of ferrous nitrate, ferrous sulfate, and various other salts which have oxidizable cations and which do not release anions encouraging scale formation. With a suitable ferrous reducing agent, the reaction is:

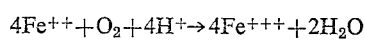

$$4Fe^{++} + O_2 + 4H^+ \rightarrow 4Fe^{+++} + 2H_2O$$

It will be noted that this deoxygenation step consumes acid remaining from the prior degasification step.

Removal of this residual dissolved oxygen at this stage of the operation sharply reduces the corrosiveness of the treated sea water and thereby makes it possible to use vapor compression distillation apparatus made from relatively inexpensive metals and alloys (e.g., stainless steels) rather than the more conventional (and more expensive) metals such as copper or copper alloys used in fabricating such apparatus.

The hot (e.g., ca. 85–101° C.) degassed, essentially neutral sea water is now fed into the vapor compression distillation apparatus 40 through check valve 39. The purpose of this valve is to insure that the hot sea water in the thermally insulated lines leading to apparatus 40 does not come to a boil while in the lines. The vapor compression distillation apparatus comprises a still 41 encased by a thermal insulating jacket 42, and containing within its upper region a vacuum pump or turbine 43 and within its lower region a liquid stirrer or agitator 44. It is convenient to drive turbine 43 and agitator 44 by motor 45 equipped with suitable reduction gear means 46 although separate motors or power sources may be used if desired. Further, the motor(s) may be located outside of the still, should this be desired. Turbine 43 reduces the pressure in the vapor space above the liquid sea water to an extent sufficient to cause the agitated liquid to boil. Vapors are drawn into turbine 43, compressed therein and forced into heat exchange coil 47 via line 48. The compressed water vapors are condensed within coil 47 while in out-of-contact heat exchange relationship with the liquid sea water within still 41. In this way the condensed water vapor gives up its latent heat to the sea water to be distilled and this makes it possible to cause the liquid to boil without supplying additional heat to the still. That is to say, the combination of the work done by turbine 43 and the recovery of a large portion of that work (recovery of heat of condensation of the distillate to supply heat of vaporization for the liquid being distilled) affords and maintains a continuous distillation operation. To insure efficient heat transfer, the condensed distillate in coil 47 continues through serpentine line 48 at the base of still 41 where additional out-of-contact heat exchange to the liquid within the still is made possible. The hot distillate (in this case, distilled water at almost its boiling point) is led away from still 41 via thermally insulated line 49 and propelled by pump 50 into thermally insulated line 21 and thence into the upper region of the reservoir 20 in tower 10.

Vapor compression distallation apparatus 40 is operated such that liquid concentrated sea water at almost the boiling point (distilland) is drawn from still 41 via thermally insulated line 51, suitable valving apparatus 52 regulating the rate of this take-off. Pump 63 propels this propels this hot concentrated sea water through thermally insulated line 54 and thence into manifold 19 in the upper region of tower 10.

It will thus be seen that the present process may be conducted on a continuous basis in a highly automated fashion. In fact, it is possible to operate a well-designed, automated, large scale system of this invention in recovering pure water from sea water at a cost of as little as about six cents per thousand gallons of pure water.

For maximum thermodynamic efficiency all portions of the over-all system containing heated liquids or vapors should be well-insulated to reduce heat losses to the outside surroundings. It will be evident, of course, that the system may be equipped with additional valves to insure safe and trouble-free operation. For example installations embodying large-sized towers will contain valving mechanisms to prevent flow of liquids through the tower unless the lines are filled. In addition, the liquids within the towers and the lines leading to and away therefrom may be held under suitable excess pressures to raise the effective boiling points of the liquids contained therein, should this be desired.

The heat transfer towers of this invention will vary in size and capacity depending upon such factors as the nature of the input feed, the initial temperature and the boiling temperature of the input feed, the rate at which the input feed is pumped through the tower, the efficiency of the thermal insulation utilized in constructing the tower, and the like. In the case of water purification or recovery operations involving aqueous input feeds ranging in temperature from about 10 to about 40° C., towers ranging from about 60 to about 80 feet in height are generally recommended inasmuch as a temperature gradient of 10° C. may be obtained with a column height of somewhat less than 10 feet under well-controlled conditions. Insofar as capacity is concerned it is desirable for the tower to have a volume generally equivalent to the total distillate output of the vapor compression distillation apparatus during a period of about 8 to about 16 hours of continuous operation. For optimum efficiency, the interior surfaces of the tower should be free from rough surfaces or other factors tending to disturb the generally quiescent state of hot distillate which it contains. In some instances additional baffle plates are useful to assist in maintaining the desired serenity within this body of liquid. As noted above, the upwardly-increasing temperature gradient within the tower will be significant, usually involving a temperature differential of at least about 40° C. and often considerably more than this.

The heat transfer surfaces within the tower, which most preferably comprise paired coaxially aligned conduits (FIGURE 2), should have high lateral heat transfer properties. For most efficient operation these heat transfer surfaces should at the same time have relatively poor conductance of heat in a vertical direction. Thus when seeking to achieve the greatest possible theoretical efficiency, these conduits may be made from heat stable plastic liner of high carbon content ribbed with closely spaced horizontal rings made from a highly heat-conductive metal such as aluminum or copper. However, in most installations the usual heat transfer materials will be entirely satisfactory for use in fabricating these heat transfer surfaces.

In some instances the tower may contain in lieu of a relatively quiescent body of distillate, a relatively quiescent body of a different fluid (e.g., nitrogen under pressure) which becomes more dense with decreasing temperature. In this case, the hot distillate and hot distilland are passed through separate heat exchange conduits or the like so that the heat possessed thereby is given up to the relatively quiescent fluid. This in turn establishes and maintains the temperature gradient for uniform heating of the upwardly flowing liquid to be distilled. However, the system as described above with reference to the drawings is much more efficient, less expensive, and much easier to maintain.

As brought out above, the use of vapor compression distillation as a step in the present invention contributes materially to the enhanced thermodynamic efficiency made possible thereby. The apparatus depicted in FIGURE 3 is to be considered exemplary of the apparatus which may be used in this portion of the over-all system— other generally equivalent vapor compression stills will be found satisfactory and may be used. Moreover, particular design features of this apparatus will enhance its efficiency. For example, it is desirable to provide creased walls or inwardly-projecting fins approaching the extremities of the propeller of the agitator so that the agitation of the liquid within the still is very thorough. In this way the concentration of the concentrated solution within the still is kept closely uniform; heat transfer to this solution from the condensed distillate within the heat transfer coils occurs more rapidly, efficiently and uniformly; and any tendency for scale to adhere to the walls is reduced. Further, the introduction of boiling chips or equivalent materials into the concentrated solution within the still prevents superheating, reduces "bumping," and promotes vaporization away from the walls of the still. Suitable screening will keep the boiling chips within the still. Also, heater 55 is preferably present in the system for supplying additional thermal energy when desired, e.g., during start-up or the like.

It will be recalled that the hot distillate and hot distilland taken from the vapor compression distillation system are at temperatures below, but in close proximity to the boiling point of the liquid being purified or recovered. This hot distillate and hot distilland are used in the tower in heating the input feed to essentially this same temperature and thus the input to the vapor compression distillation apparatus is at a temperature in close proximity to the boiling point of the liquid being purified or recovered. This in turn means that only a relatively slight reduction in pressure within the still will cause the liquid to boil. Furthermore the work done by the vacuum pump or turbine is approximately as expressed by the formula:

$$W = nRT \ln \frac{P \text{ outlet}}{P \text{ inlet}}$$

Therefore taking into account that the vapor pressure increases exponentially, it will be seen that the energy input to the turbine becomes smaller as the outlet pressure is approached by the inlet pressure. Accordingly this invention makes it possible to expend only a relatively small amount of energy in reducing the pressure above the liquid and in compressing the vapors. In short, less energy is required because the average temperature within the liquid boiling within the still is close to the equilibrium temperature at which the vapors condense on the upstream side of the turbine, and because the pressure difference across the upstream and downstream sides of the turbine is kept relatively small. In other words, a high vacuum and attendant excessive energy input to the vacuum pump are not incurred in the practice of this invention. Thus when purifying or recovering water from saline solutions the pressure within the still above the surface of the boiling solution will range from about 690 to about 580 mm. Hg.

As this invention is susceptible to considerable variation and modification, it is not intended that it be unduly restricted or limited in its scope to only the specific exemplifications herein provided. Rather what is intended to be covered hereby is that which conforms in spirit and scope to the following claims.

I claim:
1. A distillation process which comprises:
  (a) passing a saline water distilland upwardly in out-of-contact heat exchange relation to (1) a downwardly flowing stream of distilland and (2) a relatively quiescent body of distillate whose temperature in the upper region is almost the boiling temperature of the saline water distilland and whose temperature in the lower region is essentially ambient temperature, whereby the saline water distilland is heated from ambient temperature to a temperature below, but in proximity to, its boiling point at the prevailing pressure and whereby the distillate as it gives up its heat energy, increases in density and progressively but slowly gravitates to said lower region;
  (b) adjusting the pH of the heated saline water from pH of 8 to 9 to a pH of 6 to 7 by the addition thereto of mineral acid;
  (c) removing the dissolved gases from the saline water while maintaining it at almost its boiling point;
  (d) chemically treating the resultant degassed saline water to remove dissolved oxygen by the addition of a reducing ferrous salt to convert the oxygen to water and form a hot degassed, substantially neutral saline water;
  (e) subjecting the so-heated and degassed saline water to vapor compression distillation with isolation of hot distillate and hot concentrated distilland;
  (f) feeding hot distillate to the upper region of the relatively quiescent body of distillate; and
  (g) feeding hot concentrated distilland to the downwardly flowing stream.
2. The process of claim 1 wherein said distilland is sea water.
3. A process for recovering fresh water from sea water or the like which comprises:
  (a) establishing an elongate vertical heat exchanger zone having temperature gradient therein ranging from essentially ambient temperature in the lower region to almost the boiling temperature of water in the upper region;
  (b) flowing sea water initially at essentially ambient temperature upwardly through and in out-of-contact heat exchange relation to said zone so that the temperature of the sea water as it leaves said upper region has been elevated to almost the boiling temperature of water;
  (c) adjusting the pH of the heated sea water from pH of 8 to 9 to a pH of 6 to 7 by the addition thereto of mineral acid;
  (d) heating the resultant acidified sea water to near its boiling temperature;
  (e) removing the dissolved gases from the sea water while maintaining it at almost its boiling temperature;
  (f) chemically treating the resultant degassed sea water to remove dissolved oxygen by the addition of a reducing ferrous salt to convert the oxygen to water and form a hot degassed, substantially neutral sea water;
  (g) subjecting the sea water from (f) to vapor compression distillation with isolation of a distillate fresh water and a distilland concentrated sea water;
  (h) returning separate streams of said distillate and said distilland to said zone while maintaining said streams at almost the boiling temperature of water;
  (i) utilizing the distillate and the distilland from (h) and heat energy possessed thereby to maintain said temperature gradient so that the distillate and distilland are each cooled via heat transfer to flowing sea water in (b); and
  (j) withdrawing cooled distillate from said zone.
4. Apparatus for recovering fresh water from sea water and the like which comprises:
  (a) a tower adapted to contain a relatively quiescent reservoir of distillate water having from bottom to top a progressively decreasing density and progressively increasing temperature;
  (b) a plurality of elongated heat exchanger conduits positioned generally vertically within said tower, each such conduit having an innermost passage and a coaxial annular passage;
  (c) means for propelling sea water into and upwardly through the annular passages of said conduits;
  (d) degassing means including means for introducing mineral acid into the sea water to remove gases contained in the hot sea water without excessive loss of water vapor or intake of air;
  (e) outlet means for transferring sea water from said annular passages to said degassing means;
  (f) means for chemically treating the resultant degassed sea water to remove dissolved oxygen by the addition of a reducing ferrous salt to convert the oxygen to water and form a hot degassed, substantially neutral sea water;
  (g) vapor compression distillation means adapted to convert the hot degassed sea water into an isolated distillate fraction and an isolated hot concentrated distilland;
  (h) means for transferring degassed sea water from said degassing means to said distillation means;
  (i) means for transferring said isolated concentrated distilland while hot to the upper ends of the innermost passages of said conduits;
  (j) means for transferring said isolated distillate fraction while hot to the upper region within said tower without disturbing the generally quiescent state of the distillate water contained therein; and
  (k) means for withdrawing distillate water from the lower region of said reservoir.
5. The apparatus of claim 4 wherein said apparatus is further characterized in that the capacity of said tower is generally equivalent to the total distillate fraction output of said distillation means during a period of about 8 to about 16 hours of continuous operation.
6. The apparatus of claim 4 wherein said apparatus is further characterized in that said tower contains a reservoir of relatively quiescent distillate water in the range of about 60 to about 80 feet in height and in that said tower possesses a temperature gradient ranging from about the ambient temperature of sea water in its lower region up to about 85–100° C. in its upper region.

References Cited

UNITED STATES PATENTS

| | | | |
|---|---|---|---|
| 2,733,196 | 1/1956 | Hillier et al. | 203—7 |
| 2,863,501 | 12/1958 | Farnsworth | 203—11 X |
| 2,885,328 | 5/1959 | Williamson | 203—11 X |
| 2,979,442 | 4/1961 | Badger | 203—7 |
| 3,026,261 | 3/1962 | Mayfield et al. | 210—56 |
| 3,147,072 | 9/1964 | Thomsen | 23—42 |
| 3,218,241 | 11/1965 | Checkovich | 203—7 |
| 3,236,748 | 2/1966 | Pottharst | 203—26 X |
| 2,619,453 | 11/1952 | Andersen | 203—7 X |
| 3,165,452 | 1/1965 | Williams | 203—11 |
| 3,389,059 | 6/1968 | Goeldner | 202—182 X |

OTHER REFERENCES

Symposium on Saline Water Conversion, U.S. Dept. of Interior, Washington, D.C. (1958), Nat. Academy of Sciences (pages 47 through 50).

NORMAN YUDKOFF, Primary Examiner

F. E. DRUMMOND, Assistant Examiner

U.S. Cl. X.R.

23—204; 202—177; 203—11, 26; 210—59